(12) United States Patent
Findeisen et al.

(10) Patent No.: US 9,009,729 B2
(45) Date of Patent: Apr. 14, 2015

(54) TRACKING A SERVER REQUEST

(75) Inventors: Piotr Findeisen, Roseville, CA (US); Constantinos Papadopoulos, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/703,187

(22) PCT Filed: Jun. 30, 2010

(86) PCT No.: PCT/US2010/040600
§ 371 (c)(1),
(2), (4) Date: Dec. 10, 2012

(87) PCT Pub. No.: WO2012/002955
PCT Pub. Date: Jan. 5, 2012

(65) Prior Publication Data
US 2013/0086595 A1    Apr. 4, 2013

(51) Int. Cl.
| | |
|---|---|
| *G06F 9/46* | (2006.01) |
| *G06F 15/16* | (2006.01) |
| *G06F 9/54* | (2006.01) |
| *G06F 11/30* | (2006.01) |
| *G06F 11/34* | (2006.01) |
| *G06Q 40/00* | (2012.01) |

(52) U.S. Cl.
CPC *G06F 9/546* (2013.01); *G06F 9/54* (2013.01); *G06F 11/3006* (2013.01); *G06F 11/302* (2013.01); *G06F 11/3065* (2013.01); *G06F 11/3419* (2013.01); *G06F 11/3466* (2013.01); *G06F 2201/865* (2013.01); *G06F 2209/541* (2013.01)

(58) Field of Classification Search
USPC ......................................... 709/203; 719/313
See application file for complete search history.

(56) References Cited

U.S. PATENT DOCUMENTS

| | | | |
|---|---|---|---|
| 7,992,045 B2* | 8/2011 | Bansal et al. | 714/38.1 |
| 2002/0103896 A1 | 8/2002 | Von Klopp Lemon | |
| 2005/0039190 A1* | 2/2005 | Rees et al. | 719/316 |
| 2006/0074714 A1* | 4/2006 | Aziz et al. | 705/2 |
| 2007/0027742 A1* | 2/2007 | Emuchay et al. | 705/10 |
| 2007/0226128 A1* | 9/2007 | Wiryawan et al. | 705/38 |
| 2009/0150908 A1* | 6/2009 | Shankaranarayanan et al. | 719/320 |
| 2009/0172653 A1* | 7/2009 | Elliott | 717/148 |
| 2010/0287541 A1* | 11/2010 | Saunders et al. | 717/139 |
| 2010/0318976 A1 | 12/2010 | Everly et al. | |
| 2010/0333072 A1* | 12/2010 | Dulip et al. | 717/128 |

OTHER PUBLICATIONS

Barbon, F. et al, Run-Time Monitoring of Instances and Classes of Web Service 1-15 Compositions, IEEE International Conference on Web Services 2006, pp. 63-71, See chapter 3.
Korean Intellectual Property Office, International Search Report, Mar. 31, 2011, 3 pages, Daejeon, Republic of Korea.

* cited by examiner

*Primary Examiner* — Charles E Anya
(74) *Attorney, Agent, or Firm* — Trop, Pruner & Hu, P.C.

(57) ABSTRACT

A technique includes inserting (204) code (119) into an application (116) as the application (116) is executing on a computer (100). The code (119) causes the application (116) to communicate with a monitoring tool (117) about an inter-application message that is associated with a server request that is provided by a client (100). The technique includes using the monitoring tool (208) to operate on a correlation token that is appended to the message to track processing of the server request.

13 Claims, 5 Drawing Sheets

TRACKING A SERVER REQUEST

BACKGROUND

The invention generally relates to tracking a server request.

The current prevailing architectural model for server-side applications is based on the reactive principle in which the server performs some work in response to receiving an external request from a requesting party and then communicates a response (i.e., the result) to the requesting party. A major indicator of server performance is the server request latency, which is the time that elapses from the time at which the server receives the request until the time at which the server provides the response.

A performance analyst typically is interested in such factors as which particular server requests take relatively long times to execute and the internal processing details for these server requests, for purposes of understanding and pinpointing the root causes of the delays.

A conventional server request may spawn several ancillary requests in that for purposes of fulfilling the request, the initially contacted server may communicate additional requests to other servers. Such cross-server communications typically complicate the diagnostic analysis in that many components are involved and may interject corresponding problems that contribute to the overall latency in responding to the initial server request.

DETAILED DESCRIPTION

Systems and techniques are disclosed herein for purposes of tracking a server request that is made by a client and is provided to a server side programming framework (called the "server side" herein). On the server side, the server request from the client may result in a multitude of requests, which include an initial request that is received from client and resulting ancillary requests that are spawned on the server side in the processing of the initial request. More specifically, in general, the processing of a given server request from the client involves the communication of messages (called "inter-application messages" herein) among different components, or applications on the server side. In this regard, the server side may be constructed from several layers or applications, which, in turn, may reside on one or on multiple servers. When an application on the server side receives a request from a client, the application in the course of processing the request may issue ancillary requests (in the form of inter-application messages) to other applications; and this process may continue and be recursive.

As disclosed herein, for purposes of tracking the processing of the server request by the different applications on the server side, a coloring, or correlation token, is appended to each inter-application message that is communicated for purposes of fulfilling the request. As described further below, a monitoring tool, for example a diagnostic tool processes the correlation tokens for purposes of analyzing the execution associated with the processing of the server request, even if the ultimate processing of the server request involves multiple applications on the server side. In other words, the diagnostic tool uses the correlation tokens for purposes of analyzing latencies, execution times, etc. associated with processing across all components on the server side.

The techniques and systems that are disclosed herein permit inter-application message communications to be monitored, regardless of whether the inter-application messages are communicated using standardized communication protocols or using legacy protocols (proprietary protocols, for example), which do not adhere to any particular standard. Thus, some server side components may be legacy applications, which use restricted or unknown communication protocols. In this manner, some applications that are used in the processing of a server request may have been developed several years prior or even decades in the past. The monitoring tool may still be used with such applications, as the use of the correlation tokens and code snippets (described below) permit the monitoring of the inter-application message communications, regardless of the type of communication protocols that the applications employ.

Figure 1:
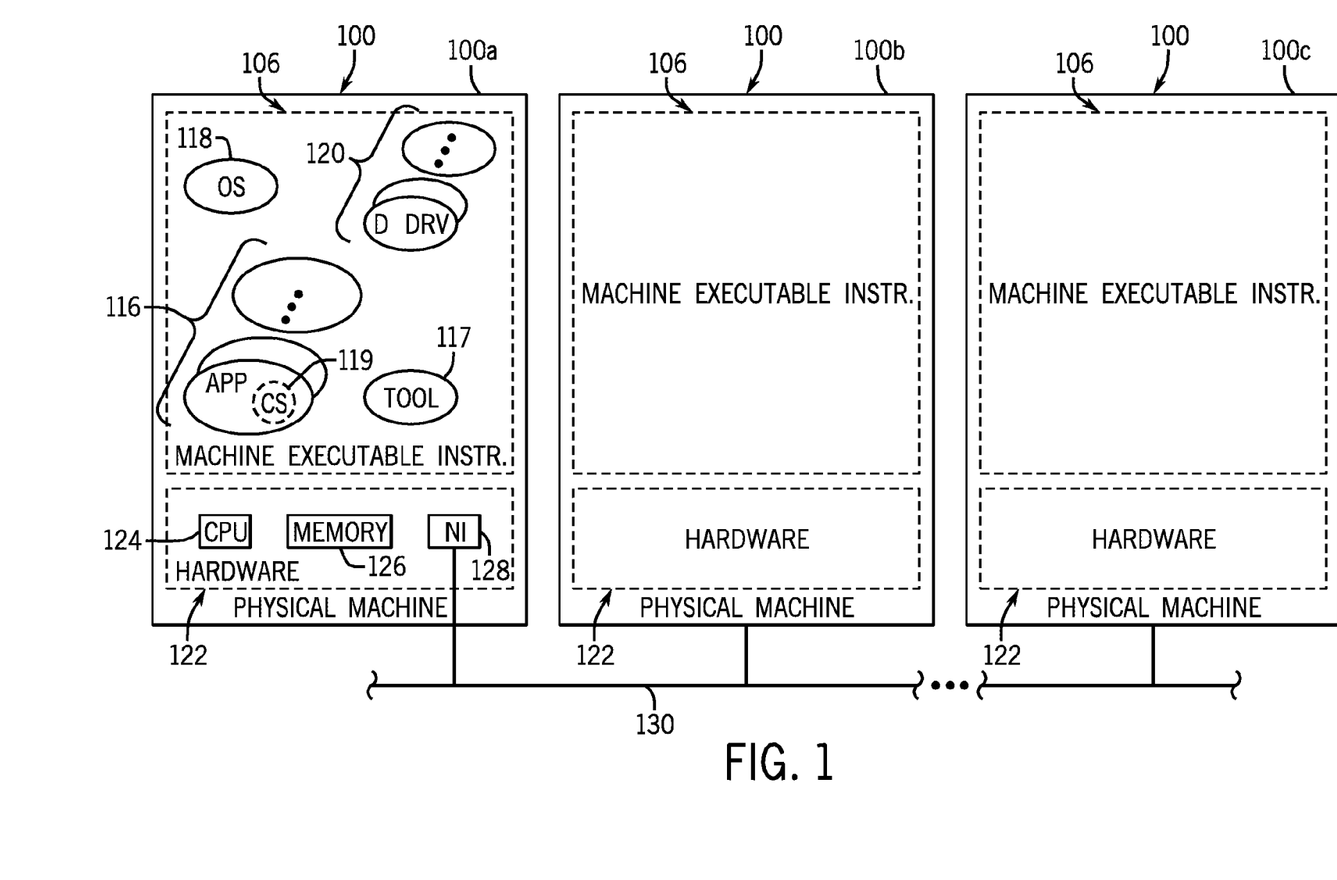
FIG. 1 is a block diagram of a system of physical machines according to example implementations.

As a more specific example, in accordance with some embodiments of the invention, the server side may be implemented on a system, such as the exemplary system that is depicted in FIG. 1. In general, the system of FIG. 1 includes multiple physical machines 100 (exemplary machines 100a, 100b and 100c, being depicted in FIG. 1) that are interconnected by a network 130. Examples of physical machines include computers (e.g., application servers, storage servers, web servers, etc.), communications modules (e.g., switches, routers, etc.) and other types of machines. The network 130 may also include system buses or other fast interconnects. "Physical machine" indicates that the machine is an actual machine made up of executable program instructions and hardware.

Examples of the network 130 include a local area network (LAN), a wide area network (WAN), the Internet, any other type of communications link, or combinations thereof. The physical machines 100 may be located within one cabinet (or rack); or alternatively, the physical machines 100 may be located in multiple cabinets (or racks) or even be geographically dispersed.

The system that is depicted in FIG. 1 may be any one of an application server, a storage server farm (or storage area network), a web server farm, a switch or router farm, other type of data center, and so forth. Also, although three physical machines 100 are depicted in FIG. 1, it is noted that more than three physical machines 100, two physical machines or one physical machine 100 may be used, in accordance with other implementations.

Although each of the physical machines 100 is depicted in FIG. 1 as being contained within a box, it is noted that a physical machine 100 may be a distributed machine having multiple nodes, which provide a distributed and parallel processing system.

As depicted in FIG. 1, in some implementations, the physical machine 100 may store machine executable instructions 106. These instructions 106 may include one or multiple applications 116, an operating system 118 and one or multiple device drivers 120 (which may be part of the operating system 118).

The physical machine 100 may also include hardware 122, which includes a processor, such as one or multiple central processing unit (CPUs) 124 (one CPU 124 being depicted in FIG. 1 for purposes of a non-limiting example). Each CPU 124 may have one or multiple processing cores. The hardware 122 may also include a system memory 126 and a network interface 128. In some implementations, one or multiple CPUs 124 execute the machine executable instructions 106. The machine executable instructions 106 may be stored in any of various forms of machine readable media, such as the memory 126, removable media, magnetic storage, optical storage, memory on another machine, etc.

In accordance with some implementations, the applications 116 on one or multiple physical machines 100 form all or part of the components of a particular composite server-side application framework. As depicted in FIG. 1, in addition to the components described above, the executable instructions 106 also include a monitoring tool 117 for purposes of tracking the inter-component processing of the server request on the server side, such as tracking the processing of the initial request from the client, processing resulting ancillary requests, gathering and processing intermediate results and ultimately providing the final result to the client.

The physical machine 100a is merely an example of a particular physical machine 100 for a server. It is noted that the server side may be formed from multiple physical machines, such as machine 100a in combination with other physical machines 100, such as physical machine 100b and/or physical machine 100c, for example. Thus, a given server side may include one or multiple applications 116 with the physical machine 100a; one or multiple applications 116 with another physical machine 100b; one or multiple applications 116 on multiple physical machines 100; etc.

Regardless of the particular implementation, for the examples that are disclosed herein, a given server request originates with an initial request that is provided by a client (via a physical machine not depicted in FIG. 1) and is received by one of the applications 116 to initiate the processing that ultimately results in a response that fulfills the client's request. The processing of the initial request from the client may spawn additional ancillary requests, which propagate (via inter-application messages) to other applications 116 that may be located on the same physical machine 100 and/or on different physical machines 100.

In accordance with implementations disclosed herein, for purposes of monitoring the inter-application messaging associated with the request processing even when standardized and/or non-standardized communication protocols are used in these communications, each of the applications 116 on the server side is dynamically modified by a code snippet 119. In general, the code snippet 119 is program code that is inserted at a particular execution, or instrumentation, point in the code of the application 116 for purposes of causing the application 116 to perform an intended function at the instrumentation point. As a more specific example, in accordance with some implementations, the code snippet 119 is derived by a program analyst who writes uncompiled program code to perform a particular function; and a run time compiler compiles this uncompiled code and inserts it into the other compiled code for the application 116 while the application 116 is executing, as described in U.S. Patent Application Publication Serial No. 20090172653, entitled, "Compiling And Inserting Code Snippets At Runtime," which was filed on Sep. 27, 2008, published on Jul. 2, 2009. The use of the code snippets 119 for a given application effectively allows automatic modification of the application 116 to permit the communication of correlation tokens in messages that are communicated to and from the application 116, regardless of the messaging communication protocol that is employed by the application 116.

In accordance with some implementations, the code snippet 119 exposes the application 116 to application programming interfaces (APIs) of the monitoring tool 117, and these APIs of the monitoring tool 117 are configured to process and update the correlation tokens that are appended on the inter-application messages. More specifically, a particular code snippet 119 may be written for purposes of inserting code at an instrumentation point of the application 116 associated with sending inter-application messages. For this example, the code snippet 119 exposes the application 116 to APIs of the monitoring tool 117, which are configured to attach an updated correlation token into an outgoing inter-application message. As another example, a particular code snippet 119 may be written for purposes of inserting code at an instrumentation point of the application 116, at which the application 116 receives messages pertaining to (initial and ancillary) requests. Therefore, when an inter-application message is received, the code snippet 119 may be used to expose the application 116 to corresponding APIs of the monitoring tool 117 for processing the message to, for example, extract and parse the correlation token. As described further below, this updated correlation token may include an updated topology for the message to indicate the history of the processing for the server request up to the time of the message.

In some implementations, the attachment of the correlation token may be used to leverage the structure of the message being passed between the application components, and the correlation token may be inserted into the message without affecting the integrity of the message structure. For example, if Hypertext Transfer Protocol (HTTP) is used as the communication protocol, additional HTTP header fields may be used for the purpose of passing the correlation token. In another example, if Java Message Service (JMS) is used for communication between the application components, a JMS message property may be used to insert the correlation token into the message.

In other implementations, when the structure of the messages passed between the application components is not flexible or even is unknown, the code snippet 119 may use a "wrapping" technique, that is, create a composite message, which contains the correlation token and the unmodified original message. On the receiving side another code snippet (the "receiving side code snippet 119" for this example) "unwraps" the received message and passes the extracted correlation token to the monitoring tool, and for this example, the receiving side code snippet 119 also extracts the original application message and passes it to the receiving application component. In all cases, the correlation tokens are attached and detached from the messages without the need to change the application or the tool source code or recompile.

Thus, the extraction of the appended correlation token from an inter-application message as well as the appending of the correlation token to an inter-application message is independent of the communication protocol that is used to communicate the inter-application message. As a result, the monitoring tool 117 may be developed without the developer or provider of the tool 117 possessing any knowledge about the communication protocols/techniques employed by the application(s) used by the prospective customers. Knowledge of the protocols/techniques is used by a programming analyst for purposes developing the code snippets 119. Because the code snippets 119 may be created any time after the application 116 or the monitoring tool 117 are released, "generic" monitoring support may be provided. Therefore, even if a given application 116 uses some obscure legacy communication technique, supporting this technique merely involves writing the code snippets 119 for the application 116, which may involve, for example, a relatively few lines of programming code. In accordance with implementations, described herein, all this happens without changing the application source code, changing the monitoring tool source code or recompiling.

Figure 2:
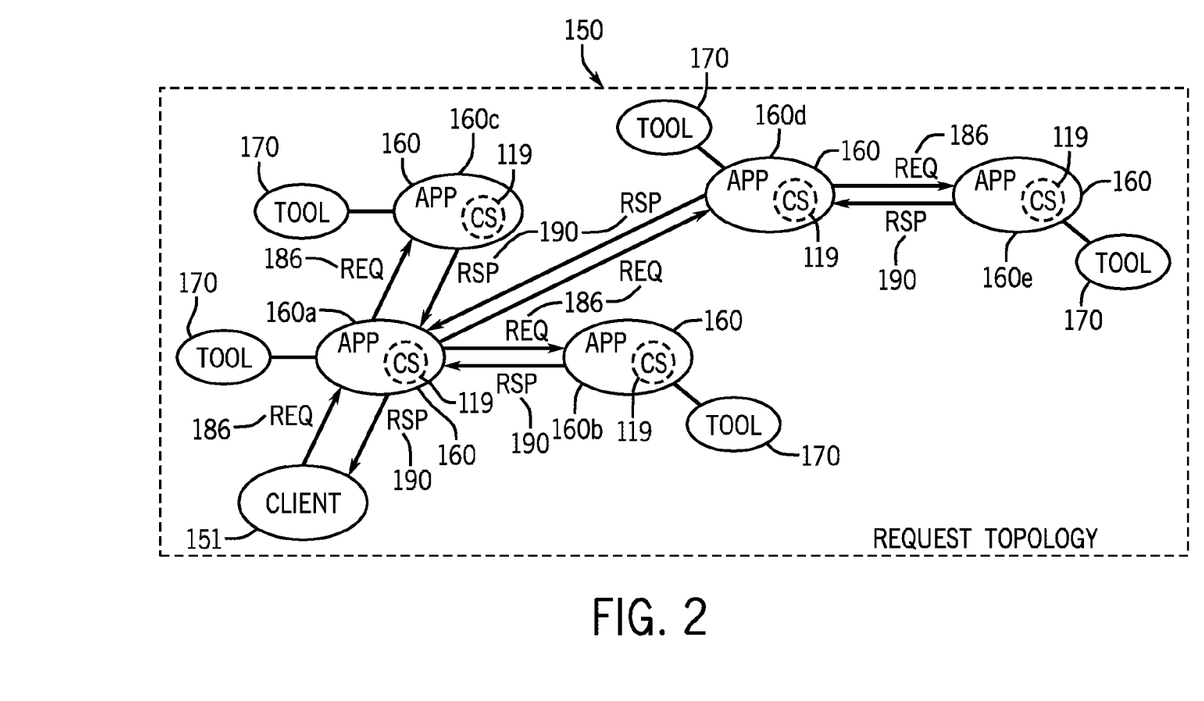
FIG. 2 is an exemplary topology associated with a server request according to example implementations.

As a non-limiting example, FIG. 2 depicts an exemplary topology 150 associated with an exemplary server request in accordance with some implementations. Referring to FIG. 2, for this example, the topology 150 is associated with the processing of a loan application, and the server side processes the loan application on behalf of a lender or bank. In this manner, a client 151 (a computer system used by the loan applicant, for example) initiates the server request by communicating an initial request 180 (a request containing the completed loan application for processing by the bank, for example) to an Internet server (as a non-limiting example), which initiates an instance 160a of an application 116 (see FIG. 1) for purposes of initially processing the request 180. As described below, the application instance 160a may directly and indirectly generate additional ancillary requests 186 to initiate various processing functions associated with the processing the loan application, and each of these ancillary requests 186 may, in turn, spawn additional ancillary requests. At a successful conclusion, the application instance 160a provides a response 190 to the client 151, which may be a request for more information, a denial of the loan, a tentative loan approval, a preliminary or intermediate result associated with the processing of the loan application, etc.

The application instance 160a is exposed to APIs of an associated instance 170 of the monitoring tool 117 (see FIG. 1) for purposes of processing correlation tokens that are appended on inter-application messages that are received by and transmitted from the instance 160c. In this regard, code snippets 119 expose the application instance 160a to APIs of the monitoring tool instance 170 for purposes of extracting the correlation tokens for incoming inter-application messages and generating the appropriate correlation tokens for outgoing inter-application messages. Other application instances 160b, 160c, 160d and 160e are configured by corresponding code snippets 119 to be exposed to APIs of associated monitoring tool instances 170 in a similar manner.

As a non-limiting example, the application instance 160a may receive the original loan application and generate an ancillary request 186 to cause the application instance 160b to determine whether the applicant is recognized as a customer of the bank. In this regard, the application instance 160b may, for example, search a database based on a social security number, date of birth and/or driver's license number of the applicant for purposes of determining whether the applicant is a customer of the bank. The applicant instance 160b returns the result (via response 190) to the application instance 160a, which may then use the results of the identification determination for purposes of requesting additional services from other application instances.

For example, the application instance 160a may submit an ancillary request 186 to the application instance 160c for purposes of requesting that the application instance 160c perform a criminal background search on the applicant. As another example, the application instance 160a may submit an ancillary request 186 to the application instance 160d for purposes of requesting that the application instance 160d determine whether the bank has any existing mortgages with the applicant. The application instances 160c and 160d return the results to the application instance 160a via respective responses 190.

The ancillary requests 186 submitted by the application instance 160a to the application instances 160c and 160d are examples of asynchronous ancillary requests, in that the application instance 160a may proceed with its processing, which does not depend on which response 190 is received first. Other ancillary requests 186 are synchronous in that a response to one request (e.g., a request to determine whether the applicant has any mortgages with the bank) may be required before another request (a request to check for liens on the identified mortgage(s), for example) is made.

As yet another example of an ancillary request, FIG. 2 depicts that the application instance 160d may submit an ancillary request 186 to the application instance 160e. As a non-limiting example, the application instance 160d may use the application instance 160e for purposes of identifying any liens on property corresponding to mortgages held by the bank.

In accordance with some implementations, as non-limiting example, the correlation token is a string that changes with every execution of the outbound call. In general, the correlation token is unique across the enterprise, which means that a different outbound call on a different machine is unable to generate the same correlation token. This setup may be used for purposes of tracing, i.e. connect instances of server requests. As a further non-limiting example, for diagnostic purposes, the correlation token may further include information, which allows entities to be linked together in an aggregate fashion for purposes of constructing the request topology.

Figure 3:
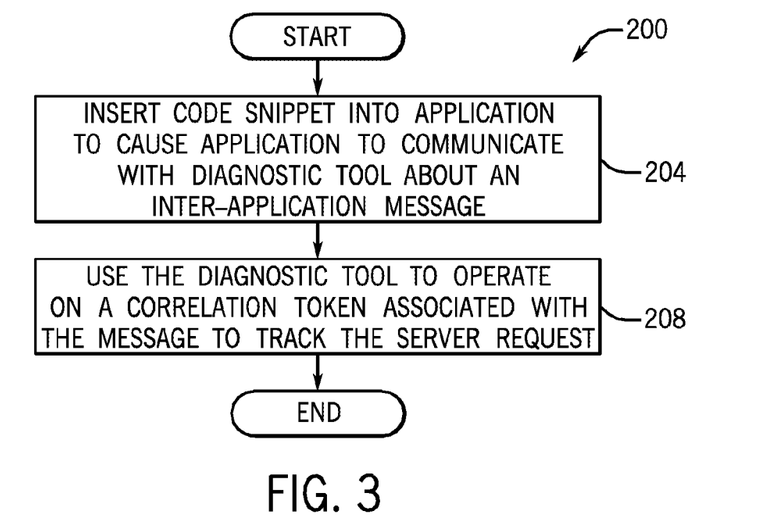
FIG. 3 is a flow diagram depicting a technique to track a server request that spawns ancillary requests according to example implementations.

Referring to FIG. 3, to summarize, a technique 200 may generally be performed in accordance with embodiments of the invention for purposes of tracking a server request. Pursuant to the technique 200, a code snippet is inserted into an application, pursuant to block 204, to expose the application to the APIs of a monitoring tool and thus, cause the application to communicate with the monitoring tool about the inter-application message. The technique 200 includes using the monitoring tool, pursuant to block 208, to operate on a correlation token associated with a message associated with the processing of a server request provided by a client for purposes of tracking the server request.

Figure 4:
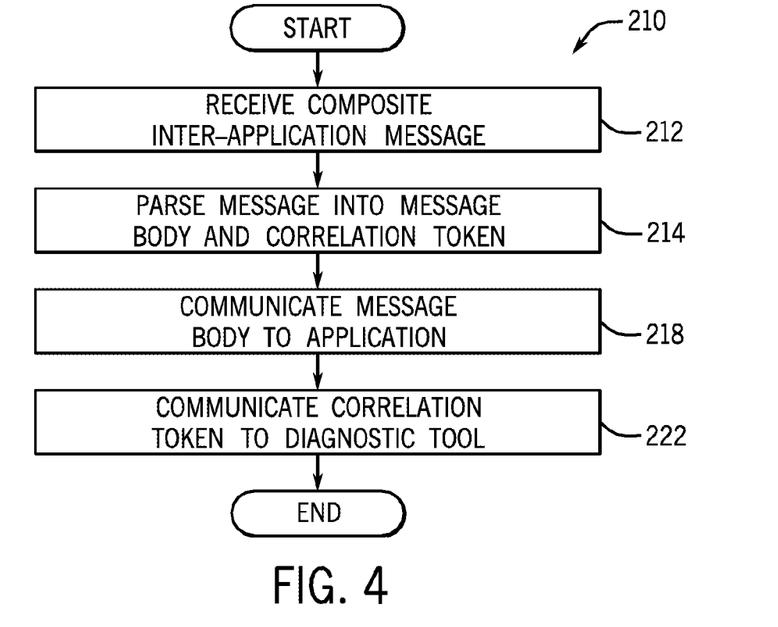
FIG. 4 is a flow diagram depicting a technique illustrating the use of a code snippet to supplement the processing of a received inter-application message for purposes of handling a correlation token according to example implementations.

In accordance with some implementations, the code snippet 119 may perform a technique 210, which is depicted in FIG. 4, for purposes of processing an inter-application message that is received by an application 116. This code snippet 119 may be inserted at an instrumentation point of the application 116, which corresponds to an execution point at which the application 116 processes a received inter-process message. Pursuant to the technique 210, the code snippet 119 receives (block 212) the composite inter-application message, which contains the message body and the pendant correlation token. The code snippet 119, by exposing the application 116 to the monitoring tool's APIs, parses (block 214)

the composite message into the body and correlation token and then communicates (block 218) the message body to the application 116. The code snippet 119 further communicates the correlation token to the monitoring tool 117, pursuant to block 222.

Figure 5:
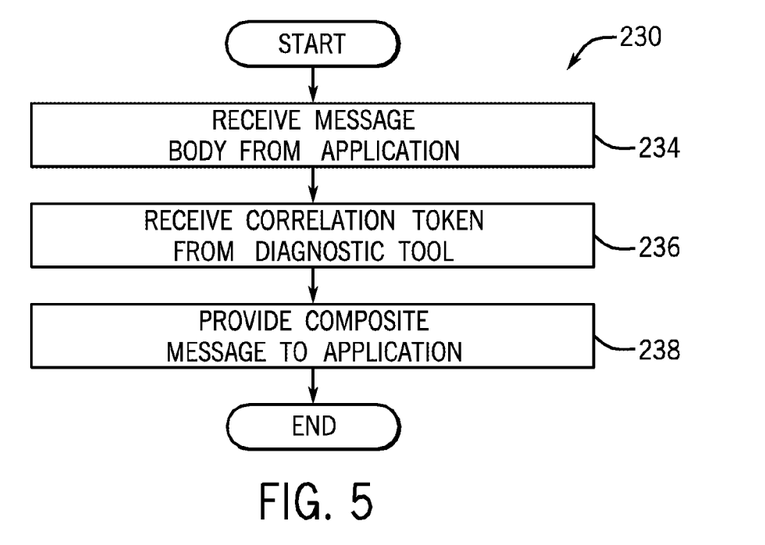
FIG. 5 is a flow diagram depicting a technique illustrating the use of a code snippet to supplement the processing of an inter-application message to be transmitted for purposes of handling a correlation token according to example implementations.

In accordance with some implementations, the code snippet 119 performs a technique 230 that is depicted in FIG. 5 for purposes of providing a composite message to be communicated from the application 116. This code snippet 119 may be inserted at an execution point at which the application communicates an outgoing inter-application message. Pursuant to the technique 230, the code snippet 119 exposes the application 116 to the appropriate APIs of the monitoring tool 117 to cause the appropriate API(s) to receive the message body from the application 116, pursuant to block 234 and receive (block 236) the associated correlation token from the monitoring tool 117. The code snippet 119 then executes the appropriate API(s) to provide the composite message to the application for transmission, pursuant to block 238.

Figure 6:
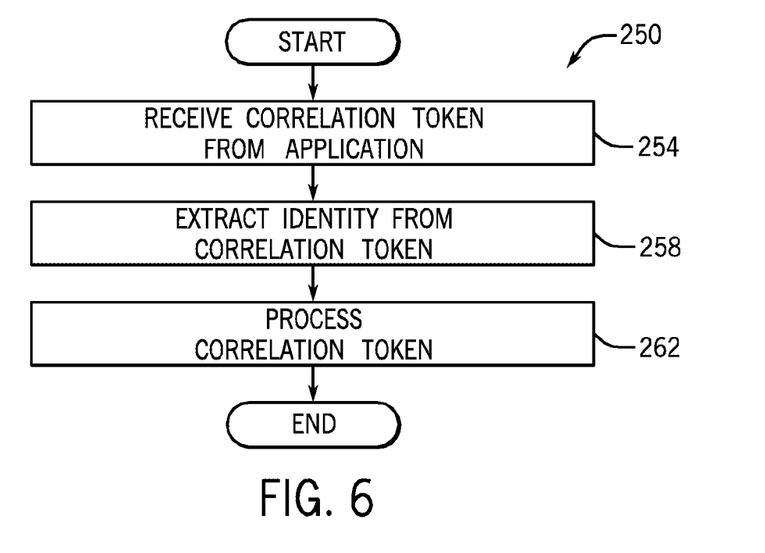
FIG. 6 is a flow diagram depicting a technique used by a code snippet in conjunction with monitoring tool APIs to process an incoming inter-application message according to example implementations.

Referring to FIG. 6, in accordance with some implementations, a code snippet 119 in conjunction with the APIs of the monitoring tool 117 perform a technique 250 for purposes of processing an incoming correlation token. Pursuant to the technique 250, the monitoring tool 117 receives (block 254) the correlation token from the application 116 and extracts (block 258) the identity of the originating server request from the correlation token, pursuant to block 258. The monitoring tool 117 may then otherwise process the correlation token, pursuant to block 262. Depending on its purpose, the monitoring tool 117 may analyze certain latencies, identify problem points in the server application framework, etc.

Figure 7:
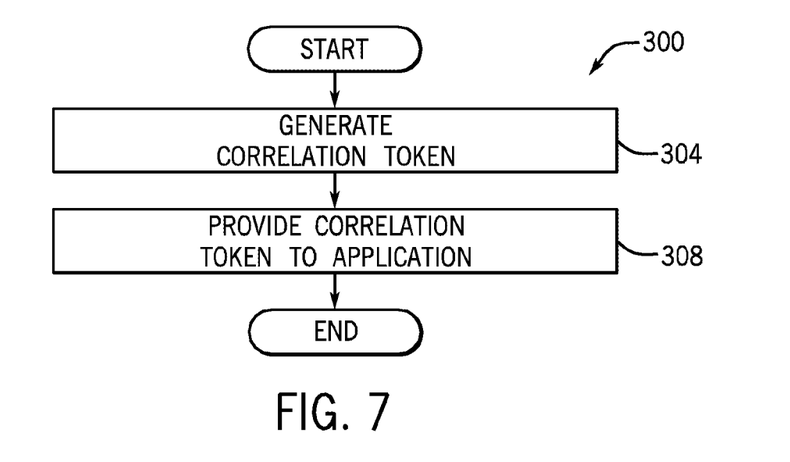
FIG. 7 is a flow diagram depicting a technique used by a code snippet in conjunction with monitoring tool APIs to process an outgoing inter-application message according to example implementations.

Referring to FIG. 7, in accordance with some implementations, a code snippet 119 in conjunction with APIs of the monitoring tool 117 perform a technique 300 for purposes of processing an outgoing composite inter-application message. Pursuant to the technique 300, the monitoring tool generates a correlation token, pursuant to block 304. In this manner, in accordance with some implementations, the monitoring tool 117 updates the request topology for the outgoing inter-process message and provides (block 308) this correlation token to the application 116.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
  inserting code into an application as the application is executing on a computer, wherein the code causes the application to communicate with a monitoring tool about a composite inter-application message associated with a server request that is provided by a client, and a correlation token being appended to a composite inter-application message;
  using an application programming interface (API) indicated by the code, to parse the composite inter-application message into a message body and the correlation token;
  communicating the message body to the application; and
  using the monitoring tool to operate on the correlation token to track processing of the server request, wherein using the monitoring tool comprises parsing the correlation token to extract information regarding an identity of the server request and a topology of the server request.

2. The method of claim 1, wherein the act of inserting the code comprises inserting a code snippet into compiled code associated with the application.

3. The method of claim 1, wherein the act of inserting the code comprises inserting the code at an instrumentation point of the application associated with receiving the composite inter-application message to extract the correlation token independently from a protocol used to communicate the composite inter-application message.

4. The method of claim 1, wherein the act of inserting the code comprises inserting the code at an instrumentation point of the application associated with communicating the composite inter-application message to another application to append the correlation token to the composite inter-application message independently from a protocol used to communicate the composite inter-application message; and
  the act of using the monitoring tool comprises updating the correlation token with information indicative of a processing of the composite inter-application message by the application.

5. The method of claim 1, wherein the act of using the monitoring tool comprises operating on the correlation token to update the correlation token with information regarding another application to process the server request.

6. An article comprising a non-transitory computer readable storage medium to store instructions that when executed by a computer cause the computer to:
  communicate with an application via a code snippet of the application to extract a correlation token appended to a received composite inter-application message, the composite inter-application message being part of a topology of messages attributable to a server request provided by a client; and
  perform diagnostic processing on the server request based at least in part on the correlation token, including using an application programming interface (API) indicated by the code snippet to parse the composite inter-application message into a message body communicated to the application and the correlation token and using a monitoring tool including parsing the correlation token to extract information regarding an identity of the server request and the topology.

7. The article of claim 6, the computer readable storage medium storing instructions that when executed cause the computer to interact with the application via another code snippet to append another correlation token into an outgoing composite inter-message communication associated with the server request independently from a protocol used to communicate the outgoing composite inter-application message.

8. The article of claim 6, the computer readable storage medium storing instructions that when executed cause the computer to extract the correlation token independently from a protocol used to communicate the received composite inter-application message.

9. The article of claim 6, the computer readable storage medium storing instructions that when executed cause the computer to update the correlation token with a timestamp indicative of a time at which the composite inter-application message was received by the application.

10. A system comprising:
  a processor-based monitoring tool to monitor a given composite inter-application message of a plurality of composite inter-application messages associated with a server request provided by a client, a topology of the plurality of composite inter-application messages being indicated at least in part by a correlation token appended to the given composite inter-application message; and an application to process the given composite inter-application message and respond to a code snippet inserted into the application to communicate the correlation token to the monitoring tool, wherein the application uses an application programming interface (API) indicated by the code snippet to parse the given composite inter-application message into a message body communicated to the application and the correlation token, and the monitoring tool parses the correlation token to extract information regarding an identity of the server request and the topology.

11. The system of claim 10, wherein the monitoring tool is adapted to generate another correlation token with information indicative of a processing of the given composite inter-application message by the application.

12. The system of claim 11, wherein the monitoring tool is adapted to cause said another correlation token to indicate a latency introduced by processing the composite inter-application message by the application.

13. The system of claim 10, wherein the code snippet causes the application to process the correlation token independently from a protocol used to communicate the composite inter-application message.

\* \* \* \* \*